United States Patent
Chu et al.

(10) Patent No.: US 11,063,718 B1
(45) Date of Patent: *Jul. 13, 2021

(54) RESPONSE RULES OF TRIGGER FRAME

(71) Applicant: MARVELL ASIA PTE, LTD., Singapore (SG)

(72) Inventors: Liwen Chu, San Ramon, CA (US); Lei Wang, San Diego, CA (US); Jinjing Jiang, San Jose, CA (US); Hongyuan Zhang, Fremont, CA (US); Hui-Ling Lou, Sunnyvale, CA (US)

(73) Assignee: MARVELL ASIA PTE, LTD., Singapore (SG)

( * ) Notice: Subject to any disclaimer, the term of this patent is extended or adjusted under 35 U.S.C. 154(b) by 76 days.

This patent is subject to a terminal disclaimer.

(21) Appl. No.: 16/416,506

(22) Filed: May 20, 2019

Related U.S. Application Data

(63) Continuation of application No. 15/469,362, filed on Mar. 24, 2017, now Pat. No. 10,298,370.

(60) Provisional application No. 62/312,666, filed on Mar. 24, 2016.

(51) Int. Cl.
*H04L 5/00* (2006.01)
*H04W 72/04* (2009.01)

(52) U.S. Cl.
CPC .......... *H04L 5/0048* (2013.01); *H04L 5/0055* (2013.01); *H04W 72/0413* (2013.01)

(58) Field of Classification Search
CPC ............ H04W 72/04; H04W 72/0406; H04W 72/0413; H04L 5/0053; H04L 5/0055
See application file for complete search history.

(56) References Cited

U.S. PATENT DOCUMENTS

| | | | |
|---|---|---|---|
| 10,298,370 B1 * | 5/2019 | Chu ....................... | H04L 5/0023 |
| 2016/0302229 A1 * | 10/2016 | Hedayat ................ | H04L 1/1685 |
| 2016/0337974 A1 * | 11/2016 | Jia ....................... | H04W 52/0235 |
| 2017/0048048 A1 * | 2/2017 | Seok ..................... | H04L 5/0007 |
| 2017/0150493 A1 * | 5/2017 | Seok .................... | H04B 7/0617 |
| 2017/0245261 A1 * | 8/2017 | Cariou .............. | H04W 74/0816 |
| 2018/0020460 A1 * | 1/2018 | Hedayat ................ | H04W 52/00 |
| 2018/0145801 A1 | 5/2018 | Wang et al. | |
| 2018/0176929 A1 | 6/2018 | Ryu et al. | |
| 2018/0198726 A1 | 7/2018 | Baron et al. | |
| 2018/0352572 A1 * | 12/2018 | Cariou ................ | H04W 74/085 |

* cited by examiner

*Primary Examiner* — Robert C Scheibel

(57) ABSTRACT

Systems and techniques relating to wireless networking systems and techniques, namely employing acknowledgement mechanisms utilized with trigger frames, include: transmitting, by a first wireless device, a first frame, wherein the first frame comprises a field indicating a response frame type associated with reception of the first frame; receiving, by the first wireless device from a second wireless device, an acknowledgement (ACK) frame associated with the field in the first frame via an established wireless communication channel, the ACK frame having a frame type corresponding to the response frame type indicated in the first frame; and receiving, by the first wireless device from the second wireless device, additional frames associated with the ACK frame.

4 Claims, 6 Drawing Sheets

RESPONSE RULES OF TRIGGER FRAME

CROSS REFERENCE TO RELATED APPLICATION

The present disclosure is a continuation of U.S. application Ser. No. 15/469,362 filed Mar. 24, 2017 (now U.S. Pat. No. 10,298,370), entitled, "RESPONSE RULES OF TRIGGER FRAME", which claims the benefit of the priority of U.S. Provisional Application Ser. No. 62/312,666 filed Mar. 24, 2016, entitled, "RESPONSE RULES OF TRIGGER FRAME". The entire disclosures of the applications referenced above are incorporated herein by reference.

BACKGROUND

This disclosure relates to wireless networking systems and techniques, namely employing acknowledgement mechanisms utilized with trigger frames.

Wireless communication, particularly wireless local area network (WLAN) technology, has become ubiquitous in the mobile computing environment. Some existing wireless networking standards, for example, WiFi protocol IEEE (Institute of Electrical and Electronics Engineers) 802.11 can be used to provide wireless connectivity between wireless devices. More than one device communicating via a wireless network may need to immediately and/or randomly access the transmission medium to wirelessly transmit and/or receive data. Some existing wireless networking technologies define a Trigger frame to enable a random access mechanism for multiuser (MU) transmissions. However, frame exchange procedures involving Trigger frames (and responses) may exhibit certain tradeoffs in favor of faster access to the medium. It may be desirable to implement various capabilities, such as reducing the number of transmissions, that potentially enhance these access mechanisms and improve overall system performance.

SUMMARY

This disclosure relates to wireless networking systems and techniques, namely employing acknowledgement mechanisms utilized with Trigger frames. According to an aspect of the described systems and techniques, a method includes: transmitting, by a first wireless device, a first frame, wherein the first frame comprises a field indicating a response frame type associated with reception of the first frame; receiving, by the first wireless device from a second wireless device, an acknowledgement (ACK) frame associated with the field in the first frame via an established wireless communication channel, the ACK frame having a frame type corresponding to the response frame type indicated in the first frame; and receiving, by the first wireless device from the second wireless device, additional frames associated with the ACK frame.

According to another aspect of the described systems and techniques, a system includes: a first wireless device configured to: transmit a first frame, wherein the first frame comprises a field indicating a response frame type associated with reception of the first frame; receive an acknowledgement (ACK) frame associated with the field in the first frame via an established wireless communication channel; and receive additional frames associated with the ACK frame; and a second wireless device configured to: transmit the ACK frame in response to receiving the first frame from the first wireless device, wherein the ACK frame is of a frame type corresponding to the response frame type indicated in the first frame; and transmit the additional frames based on the response frame type indicated in the first frame.

According to another aspect of the described systems and techniques, an apparatus includes: a wireless transceiver; and circuitry coupled with the wireless transceiver configured to: transmit a first frame, wherein the first frame comprises a field indicating a response frame type associated with reception of the first frame; receive an acknowledgement (ACK) frame associated with the field in the first frame via an established wireless communication channel, the ACK frame having a frame type corresponding to the response frame type indicated in the first frame; and receive additional frames associated with the ACK frame.

The described systems and techniques can result in one or more of the following advantages. A trigger frame exchange sequence implemented according to the described techniques may reduce the amount of additional frame transmissions and maintain an acceptable latency in transmission of data. Moreover, the disclosed acknowledgment scheme may preclude the need for explicit acknowledgement requests, thereby reducing the amount of traffic on the network, and improving efficiency of the frame exchange sequence. The triggering mechanism can be customized, for example tuned based on the capabilities of wireless stations (STAs) and/or an operational environment. Accordingly, the disclosed techniques potentially provide improved function of the network entities and increased MAC efficiency.

BRIEF DESCRIPTION OF THE DRAWINGS

Like reference symbols in the various drawings indicate like elements.

DETAILED DESCRIPTION

Figure 1A:
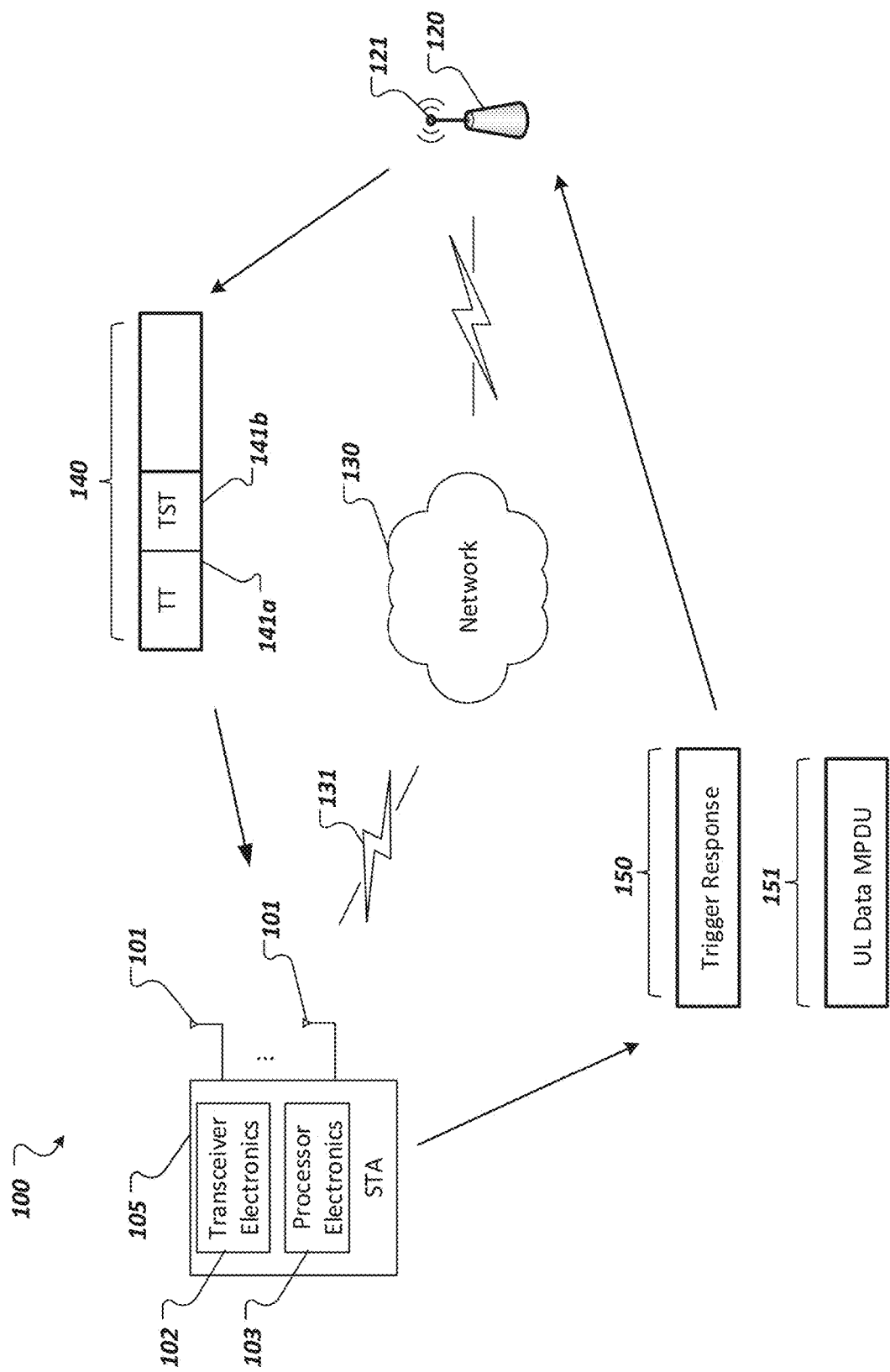
FIG. 1A shows an example of a wireless communication system used for implementing acknowledgement techniques utilized with trigger frames.

This disclosure relates to wireless networking systems and techniques, namely employing acknowledgement mechanisms utilized with Trigger frames communicated between wireless devices, such as wireless stations (STAs) and access points (APs). FIG. 1A shows an example of a wireless communication system 100 including wireless network 130. In the example of FIG. 1A, the wireless network 130 is implemented as a WLAN. As an example, the wireless communication system 100 is implemented as a basic service set (BSS) architecture according to IEEE 802.11 communication standard. The wireless communication system 100 can be employed to provide wireless connectivity for stationary, portable, and mobile devices within accessible range to establish wireless communication links 131, or channels, supported by the wireless network 130. The wireless communication system 100 includes components that interact with one another in order to provide an over-the-air (OTA) interface between STA 105 and AP 120. The AP 120 can be implemented as a wireless networking device including an antenna 121 to communicate with wireless devices, such as STA 105 and other components of the wireless network 130.

The STA 105 can be a wireless communication device having circuitry that includes transceiver electronics 102 to send and receive wireless signals over one or more antennas 101 and processor electronics 103 to effect the wireless communications using the transceiver electronics 102. In some implementations, the STA 105 includes dedicated circuitry configurations for transmitting and dedicated circuitry configurations for receiving. In addition, the processor electronics 103 of STA 105 can include one or more processors, such as a digital baseband processor and one or more additional dedicated processing units (e.g., a power management unit and audio codec). As an example, the processor electronics 103 can include a Digital Signal Processor (DSP), a MicroController Unit (MCU), and at least one memory device to hold data and potentially instructions for the MCU. The transceiver electronics 102 of STA 105 can possess the components, circuitry, and architecture necessary to support various wireless communication functions, for example transmitting and/or receiving information via WiFi networking technology. Although the wireless communication system 100 is shown as including STA 105, multiple STAs can be communicatively connected to network 130 supporting wireless communication between other STAs and with the AP 120.

AP 120 can be connected to additional network devices, such as routers and modems, for example, operating to further connect wireless devices to a wide area network (WAN), such as the Internet. The AP 120 can be employed to register STA 105, thereby allowing STA 105 to receive wireless communication services. As shown in FIG. 1A, the system 100 includes a STA 105 that can be controlled by a configuration function that determines when a station can transmit and/or receive information via the network 130. In some implementations, AP 120 implements direct communication between the STA 105 and another device, such as point-to-point communication, where a wireless channel is allocated for the devices to communicate directly. The STA 105 can communicate with one or more other wireless communication devices and/or the AP 120 using one or more antennas 101 and one or more wireless transmission technologies. The wireless technologies employed can include near field communications (NFC), Bluetooth (BT), WiFi, as well as mobile phone technologies, such as WCDMA (Wideband Code Division Multiple Access), CDMA2000, UMTS (Universal Mobile Telecommunications System), GSM (Global System for Mobile communications), High Speed Packet Access (HSPA), and LTE (Long-Term Evolution, often referred to as 4G). In some implementations, the system 100 can also include various other wireless communication components, such as base stations (BS), additional APs, and wireless clients.

Moreover, the wireless communication system 100 supports the acknowledgement techniques described herein. For instance, a wireless device, such as STA 105, communicating via the wireless network 130 utilizes the acknowledgement techniques in response to a trigger frame 140 transmitted from the AP 120. FIG. 1A illustrates AP 120 transmitting a trigger frame 140 including trigger type (TT) 141a and trigger specific type (TST) 141b to STA 105. The TT 141a and TST 141b serve to indicate that a specific frame type is requested as a response from the STA 105. In an embodiment, the format of trigger frame 140 includes TT 141a only (e.g., TST 141b is not used) to indicate a specific frame type is requested as a response from the STA 105. The TT 141a and TST 141b also indicate whether the response transmitted from STA 105, for example trigger response 150, needs an acknowledgement of its reception. For example, a buffer status report or channel available report does not require acknowledgement from the AP 120. In some instances, a sounding feedback transmitted from the STA 105, to the AP 120, does not require that an acknowledgement be sent in response. In this case, the TT 141a and TST 141b can indicate that the AP 120 is not required to send an acknowledgement back to the STA 105, upon receiving the sounding feedback from the STA 105. In other cases, for example data frames transmitted from the STA 105, acknowledgement from the AP 120 is required.

For the purposes of illustration, the TT and TST indications 141a, 141b are shown proximately together; however, it should be appreciated that FIG. 1A intends to generally illustrate that the techniques herein are capable of enhancing acknowledgement mechanisms by indications in a shared frame, and not necessarily a frame limited to the fields of the particularly shown format and/or ordering of fields (or subfields). Additional detail regarding an example of a format of the trigger frame 140 used to implement the techniques is discussed in reference to FIG. 2. In accordance with the format of the trigger frame 140, the STA 105 transmits a response to the trigger frame 140 that contains at least the frame with the required type (if available at the STA side). In instances where the STA does not have the frame with the required type as specified in the trigger type 141a indication, the STA 105 is configured to transmit a Quality of Service (QoS) Null frame or other frames to the AP 120.

According to the techniques described, the AP 120 is configured to include an indication of a trigger type 141a in a common info field (shown in FIG. 2) of the frame 140 for soliciting a response to triggering communication from the STA 105. As an example, AP 120 transmits trigger frame 140 to allocate channel resources of the wireless network 130 for an uplink (UL) transmission from STA 105, and to solicit response frame(s) 150 during the UL transmission. In some cases, if the UL resource (e.g. UL subchannel width, MCS, UL PPDU length) is more than the transmission requirement of the response defined by the trigger frame 140, frames of other types can be additionally transmitted in the UL from the STA 105. For instance, the AP 120 can use the trigger frame 140 to solicit a response 150 implemented as beamforming (BF) feedback. If the UL resource for BF feedback carries both BF feedback and channel available report, STA 105 can transmit BF feedback and Data frame(s) (or management frames), illustrated as UL Data MPDU 151, to convey channel available report from the STA 105. In this case, the additional transmitted channel available report helps the subchannel allocation for the future data transmission from the STA 105. In another example, the UL resource for BF feedback carries both BF feedback and Data frame 151, which is a buffered data frame. Accordingly, STA 105 can transmit BF feedback and Data frame(s) 151 from the single STA 105 to the AP 120. In another example, a response of the trigger frame 140 can be buffer status report. In this case, the additional frame aggregated with buffer status report can be Data frame 151. In yet another example, the response of the trigger frame 140 can be an available channel report. The additional frame aggregated with available channel report can be Data frame 151, which is transmitted to the AP 120.

In accordance with existing wireless communication technology standards, the STA 105 transmitting Data frame(s) 151 to the AP 120 solicits responses, or acknowledgement frames (ACKs or BAs), from the AP 120 that are communicated to the STA 105 immediately responsive to a successful reception of the Data frame(s) 151. Thus, according to the example, the STA 105 transmitting the aggregation of trigger response 150 and UL Data MPDU frame(s) 151 requires the AP 102 to transmit additional acknowledgement frames. In some cases, transmitting the additional acknowledgement frames can potentially alter, or otherwise interrupt, the frame exchange sequence between the STA 105 and the AP 120 associated with the initially communicated trigger frame 140. Consequently, the techniques described implements a mechanism that utilizes the same ACK policy (e.g. no immediate acknowledgement) by both the AP 120 and the STA 105. In this case, the STA 105 is communicating either the trigger response frame 150 or the aggregation of the trigger response frame 150 and UL Data/management MPDU frame 151, if the trigger response frame 150 does not require acknowledgement. In the instances where trigger response frame 150 requires an acknowledgement, the additionally transmitted data frames (or management frames) used in aggregation of the trigger response and UL Data/management MPDU frame(s) 151 can solicit acknowledgement. Alternatively, the additionally transmitted data frames (or management frames) do not solicit an acknowledgement in some cases. The techniques described can provide a more efficient medium usage, by having the single STA 105 use the remaining medium time to transmit unrequested data/management frames when the trigger response 150 does not use all the UL subchannel.

Figure 1B:
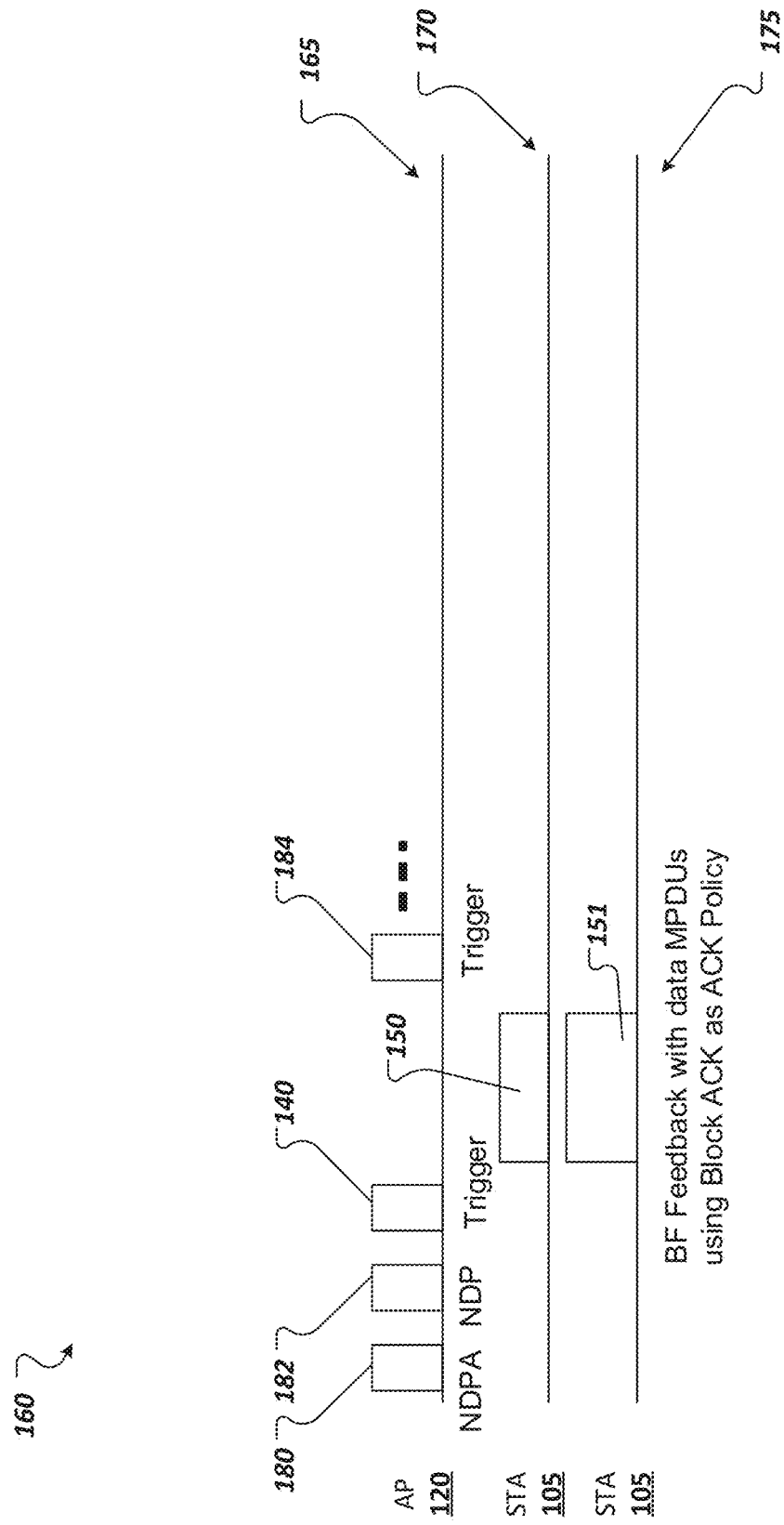
FIG. 1B shows a diagram of frames exchanged between an access point (AP) and a wireless station (STA) implementing acknowledgement techniques utilized with trigger frames within a wireless communication system shown in FIG. 1A.

FIG. 1B shows a diagram 160 of frames exchanged between the AP 120 and the STA 105 implementing acknowledgement techniques utilized with trigger frames within a wireless communication system 100 shown in FIG. 1A. It should be noted that the frames exchanged generally corresponds to the frames communicated between the STA 105 and the AP 120 illustrated in, and discussed in reference to, FIG. 1A. As illustrated, frame sequence 165 shows the AP 120 transmitting a null data packet announcement (NDPA) 180 followed by a null data packet (NDP) 182 to be received by the STA 105. In some implementations, the NDP frame 182 is implemented as a carrying MAC information (CMI) frame. Subsequently, the AP 120 transmits the trigger frame 140 to the STA 105. According to the example, the trigger frame 140 serves to request that the STA 105 use a specific frame type as the response to the trigger frame. In one example, if the response from the STA 105 does not use all medium time in the subchannel, the STA 105 transmits the aggregation of the requested response to the trigger frame and the UL Data/management MPDU frame(s) 151. In another example, the trigger frame 140 can have a format indicating that the appropriate response includes that the STA 105 transmits additional frames, such as data/management MPDUs. Details regarding the trigger frame and the format including various indications are discussed in reference to FIG. 2.

Thereafter, frame sequence 170 shows the STA 105 transmitting a response frame 150 to the AP 120, as an indication of successful reception of the aforementioned trigger frame 140. Moreover, based on the unused medium time in the subchannel defined in the received trigger frame 140, the STA 105 is shown at frame sequence 175 as transmitting the aggregation of BF feedback frames with data MPDUs frames 151. As illustrated, response frame 150 can be implemented as a BF feedback frame, for instance, and the aggregation of response frame and data MPDU frames 151 utilize the same ACK policy (e.g. no immediate acknowledgement) that is a Block ACK policy (the acknowledgement will be transmitted later) for data MPDU frames, and Action no Ack policy for BF feedback frame. Therefore (in using the same ACK policy as the requested response frame 150 for the aggregation of response frame and data frames 151 (e.g. no immediate acknowledgement), the frame exchange with response frame 150 (BF feedback) and the aggregation of response frame with data the frames 151 from the STA 105 have no immediate acknowledgement. Accordingly, in returning to frame sequence 165, the AP 120 is shown as transmitting a second trigger frame 184 to the STA 105, in response to receiving the aforementioned frames 150, 151 from the STA 105. The second trigger frame 184 indicates that the combination of response frame 150 and additional data frames from the STA 105 does not change the frame exchange.

Figure 2:
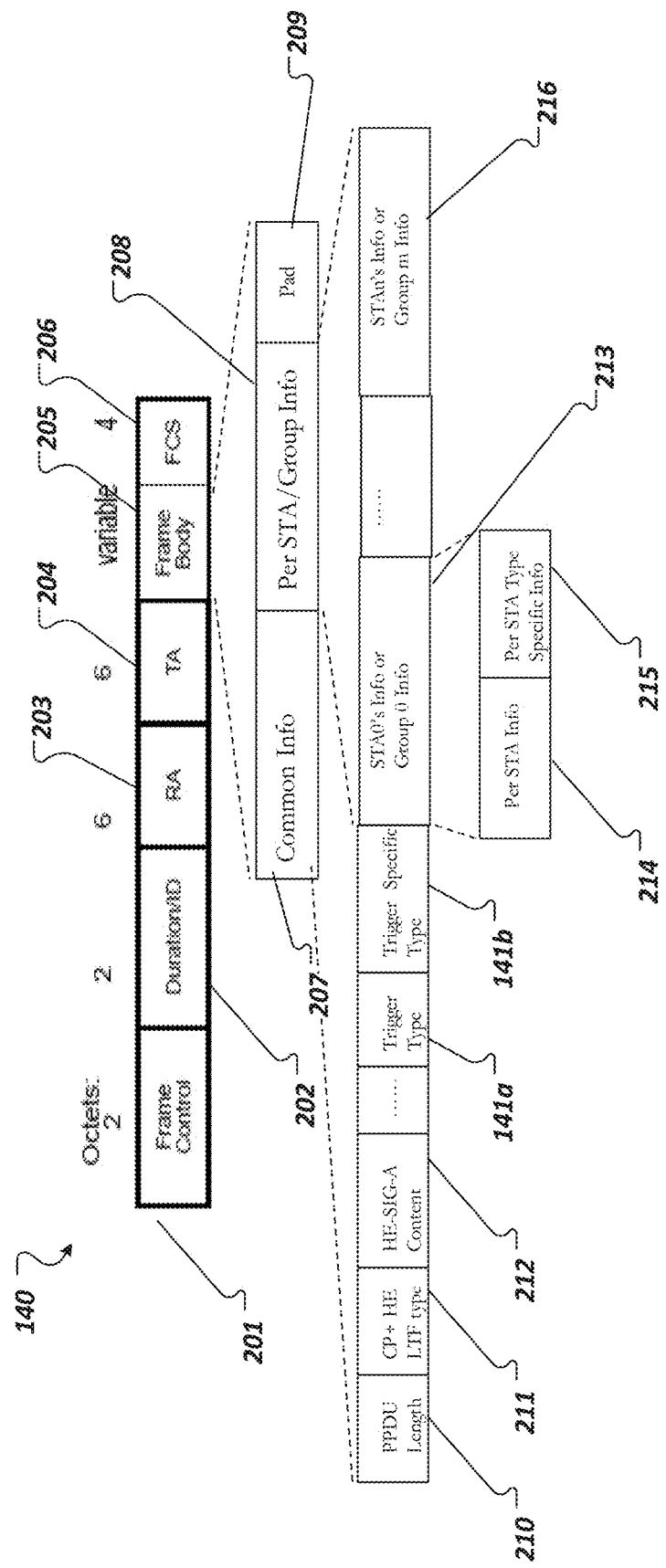
FIG. 2 shows an example of a trigger frame format employed in implementing acknowledgement techniques, for example in the wireless communication system of FIG. 1A.

FIG. 2 shows an example of a format for a trigger frame 140 including trigger type 141a and trigger specific type 141b subfields for implementing the acknowledgement techniques described. Frame 140 shown in FIG. 2 is implemented as a MPDU that is formatted, or otherwise designed to allow for implementing at least the trigger frame acknowledgement policy. That is, the techniques and systems disclosed use subfields 141a, 141b, to implement the acknowledgement sequence that reduces the amount of end of frame (EOF) padding transmitted through aggregating data/management frame with the response defined by the trigger frame and thereby potentially improving MAC efficiency. As shown in FIG. 2, the trigger frame 140 has a format that contains one or more fields including, but not limited to: frame control 201; duration ID 202; received address (RA) 203; transmitted address (TA) 204; frame body 205; and frame check sequence (FCS) 206.

Additionally, as shown in FIG. 2, the frame body 205 field can include multiple fields. As illustrated, the frame body 205 field can further contain subfields including, but not limited to: common info 207; per STA/Group info 208; and padding (PAD) 209. Furthermore, the common info 207 field can include multiple subfields including, but not limited to: PLCP Protocol Data Unit (PPDU) length 210; cyclic prefix (CP) and long training field (LTF) Type subfield 211; HE Signal (SIG)-A Content 212; trigger type 141a, which indicates the frame type requested as response; and trigger specific type 141b, which indicates the type of trigger frame. In some implementations, trigger specific type is not needed. The per STA/Group info 208 field can include subfields corresponding to each of multiple identified STAs illustrated in the format as STA0 Info or Group0 Info 213, which further includes per STA info 214 and per STA type specific info 215, and repeating to a STAn info or Groupn info 216.

According to the techniques described, the trigger type 141a subfield is used as an indication of the frame type allowed to serve as a response to the trigger frame 140 by the recipient STA. For instance, the trigger type 141a can indicate a beamforming poll trigger as a BF feedback response, and if the BF feedback response is not enough to use whole medium time of UL subchannel, corresponding Data MPDUs are communicated in response (as shown in FIG. 1A). Other types of frames can be designated by trigger subfields 141a, 141b as deemed necessary and/or appropriate. In some implementations, trigger frame 140 shown in FIG. 2 is implemented as a MANAGEMENT MPDU frame that is formatted, or otherwise designed to allow for implementing at least the acknowledgement aspects in response to triggering.

Figure 3:
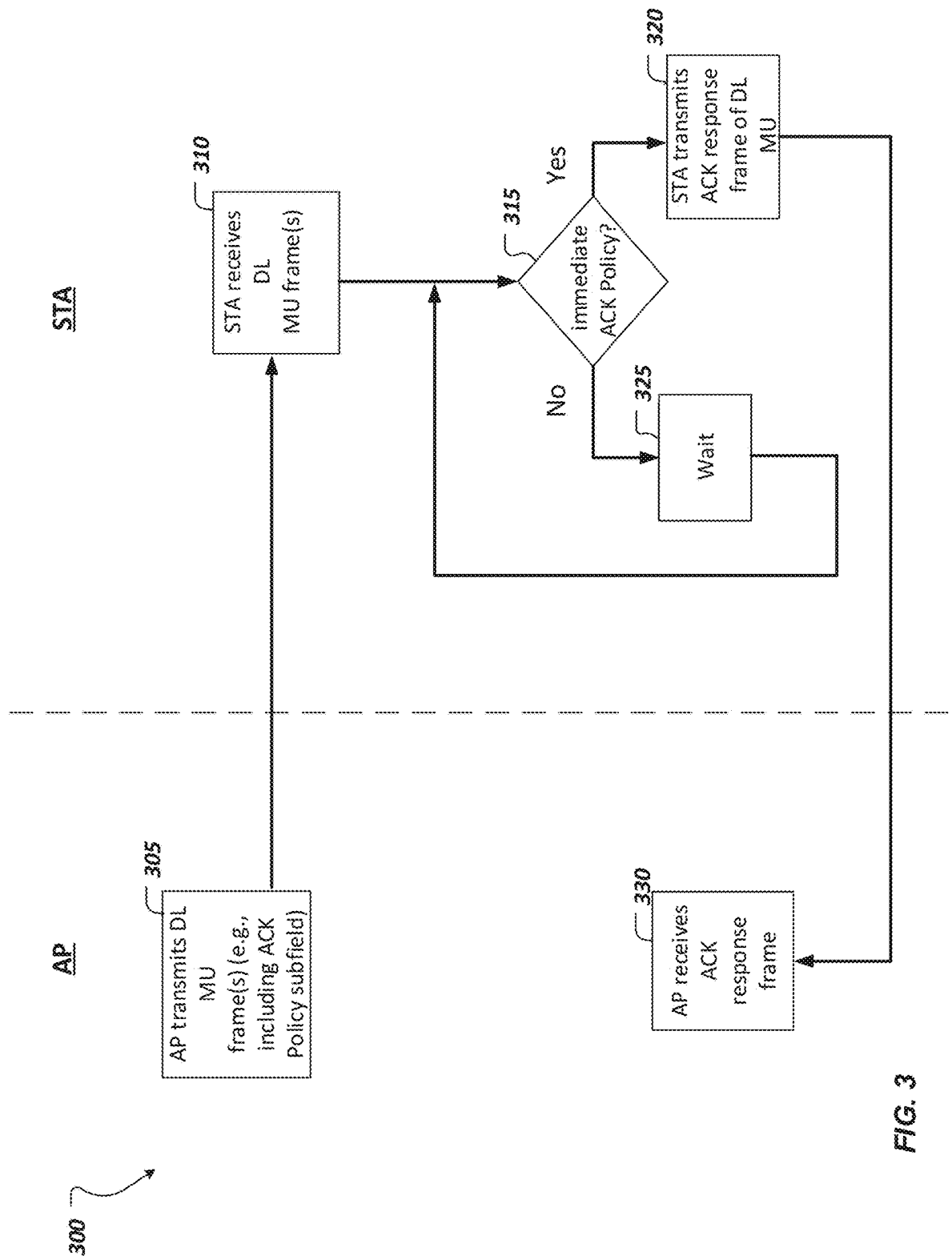
FIG. 3 shows a flow diagram of an example of processes performed by an AP and STA implementing acknowledgement techniques in a downlink (DL) multiuser (MU) transmission.

FIG. 3 shows a flow diagram of an example of processes 300 performed by an AP and a STA implementing acknowledgement techniques in a particular transmission, namely DL MU transmission. As an example, processes 300 are shown as operations implementing the described acknowledgement techniques as performed at the respective wireless devices, for instance a DL transmission to STA from an AP. In multiuser communication, it should be appreciated that more than one STA is capable of being involved in the communication. For instance, a communication process is capable of downlink to multiple STAs simultaneously. The processes 300 involves an acknowledgement procedure for DL MU PPDU, in which explicit and dedicated acknowledgement requests are not necessitated to respond to successful transmission. The processes 300 begins at 305, with a wireless device, namely an AP, communicating via a wireless network to transmit one or more frames to the STA in a DL MU transmission. In some cases, the transmitted frame is implemented as a MPDU, for instance a Data/Management MPDU.

Additionally, the frames transmitted from the AP are formatted to include an indication of an ACK Policy. In one example, the management frame trigger indicates the associated response frame and whether the AP will acknowledge the response frame. In another example, the ACK policy can convey that an individual ACK is used for every Data/Management MPDU (i.e., frame). Data MPDUs have a format using an ACK Policy subfield, which is located in the QoS Control field or in the Frame Control field of the frame. The ACK Policy subfield can be set to identify the acknowledgment policy that is followed upon the delivery of the MPDUs in downlink to the STA. In some implementations, the ACK policy indicates that acknowledgement of the DL MU is poll-based acknowledgement or UL MU acknowledgement. In some examples, the ACK policy indicates that acknowledgement of the DL MU can be transmitted later, (e.g. BA ACK policy).

Furthermore, the acknowledgement of the DL MU can be enabled as either a poll-based acknowledgement procedure or MU acknowledgement procedure. For instance, the indication in the ACK policy subfield of the frame is set to a value of "00" or "01", signaling that the sender, (i.e., AP), is enabling poll-based acknowledgement or UL MU acknowledgement, respectively.

At 310, the STA receives the DL MU frames from the AP. Subsequent to receiving the downlinked frames, a check is performed at 315, to determine the appropriate ACK policy utilized by the sender for response to the transmission, namely whether a poll-based ACK (i.e., immediate ACK), MU based ACK (i.e., immediate ACK), or BA ACK (i.e., non-immediate ACK) policy is employed. As an example, the STA determines whether the ACK policy subfield indicates MU acknowledgement, by identifying the policy indication "01" in the QoS Control field.

In instances where the STA determines a non-immediate ACK policy is indicated by the ACK policy subfield, shown as "No" in FIG. 3, the STA waits at 325. Note that the STA and/or the AP can engage in other activities during the wait 325. In one example, the AP can be configured to attempt another DL MU transmission during the wait 325. In another example, the AP can be configured to schedule an UL MU transmission during the wait 325.

In the example illustrated in FIG. 3, the process performed by the STA is shown as iteratively performing check 315 at the STA to determine whether an immediate ACK procedure is utilized. In some cases, the check at 315 is performed one or more times, by the STA, until an immediate ACK policy is determined to be adopted by the AP for the DL MU transmission. Consequently, the STA, upon reception of the DL MU frames, responds with either poll-based acknowledgment or MU based acknowledgement as indicated in the received QoS ACK policy.

In the case that an immediate ACK procedure is conveyed in the received frame, illustrated as "Yes" in FIG. 3, the STA is notified that the frames solicit an immediate ACK response or other response defined by DL trigger frame. Accordingly, at 320 the STA transmits an ACK response frame or other response frame to the AP. The STA transmits the ACK response frames or other response frame in accordance with the ACK policy designated by the AP via the trigger frame, in response to receiving the DL MU frames. In some instances, the ACK response frame is implemented as a BlockACK frame or ACK frame.

At 330, the AP receives the ACK response frames or other response frame, ending the frame exchange sequence of the example. Thus, the AP is notified that the STA has successfully received the frames in the DL MU transmission.

Figure 4:
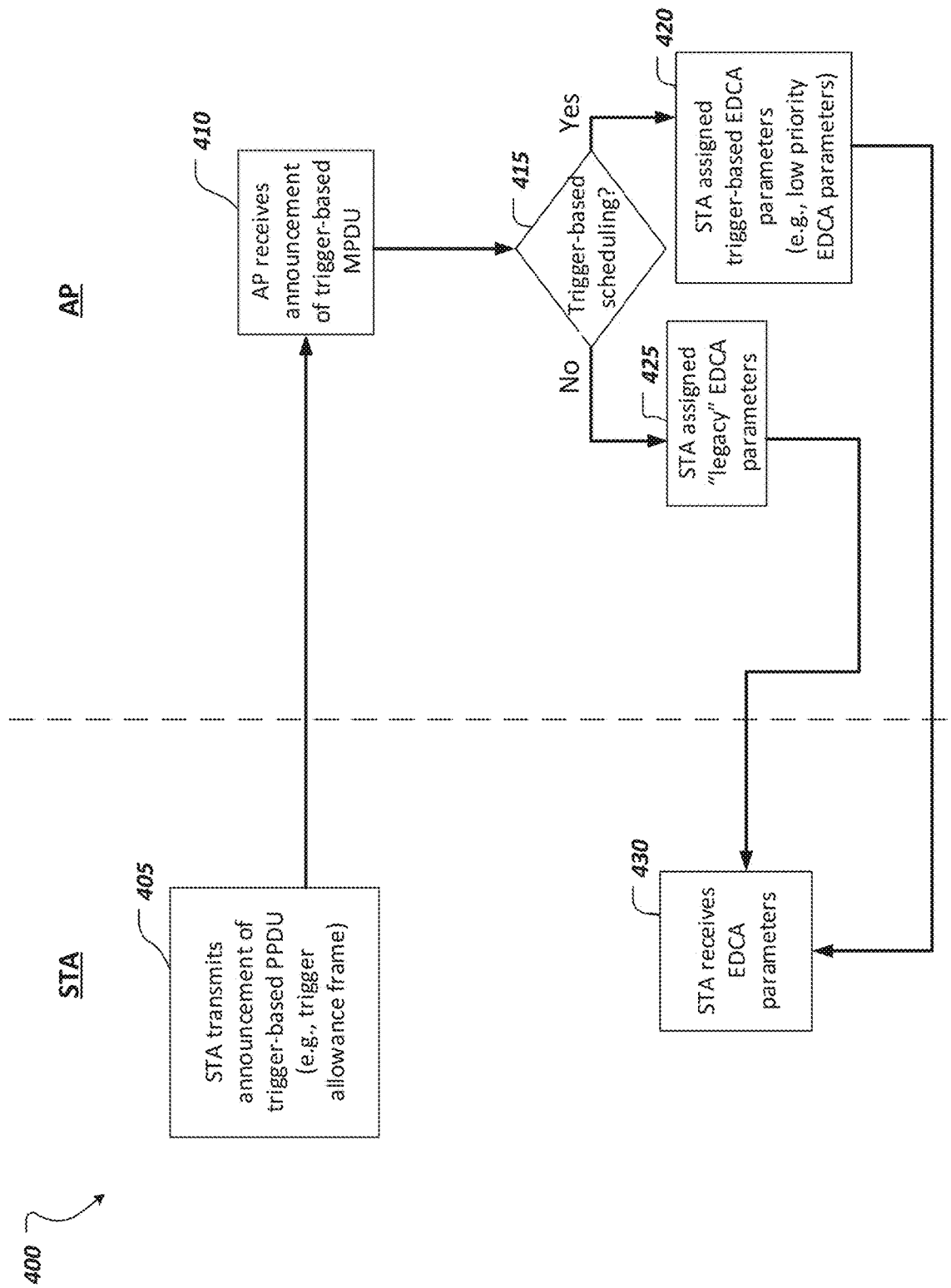
FIG. 4 shows a flow diagram of an example of processes performed by an AP and a STA implementing trigger scheduling techniques.

FIG. 4 shows a flow diagram of an example of processes 400 performed by an AP and a STA implementing trigger scheduling techniques. As an example, the processes 400 involve the STAs in a BSS to declare its support for trigger scheduling, and HE trigger-based PPDU. In a BSS that does not implement trigger-based scheduling, each STA is configured to transmit frames through Enhanced Distribution Channel Access (EDCA) procedures. EDCA is a method of channel access, similar to those defined in the legacy 802.11 MAC, that defines Traffic Categories. For example, in accordance with EDCA procedures, high-priority traffic has a higher chance of being sent than low-priority traffic. In some existing wireless technology standards, such as 802.11ah standards, STAs in a BSS use the same EDCA parameters. Thus, when communicating within a BSS, the EDCA parameters used are from the EDCA Parameter Set element received from the AP of the BSS with which the STA is associated.

Additionally, at least two types of EDCA parameter sets are defined in a BSS that particularly support trigger-based scheduling, including: legacy EDCA parameters for STAs that are not schedule by trigger frames from the AP; and low-priority EDCA parameters for STAs that are scheduled by trigger frames from the AP. In some implementations, the STAs in a BSS enabling trigger scheduling can be assigned the lower priority (e.g., low priority parameters) to transmit frames through the EDCA procedure. However, the processes 400 allow for STAs in a BSS to declare whether trigger scheduling is employable, to tradeoffs associated with utilized triggered transmission, as opposed to scheduled transmission (transmission window).

The processes 400 begin at 405, with the STA in the BSS transmitting a frame that announces whether it supports trigger scheduling and/or HE trigger-based PPDU. In the disclosed techniques, communication between entities performing processes 400 is established via a wireless network. In some implementations, the announcement is communicated in an exchange of management frames between the STA and the AP, for instance during frame exchange in an association procedure. In some instances, the STA transmits the announcement, at 405, in response to a triggering event, such as configuring any suitable device circuitry (e.g., transceiver electronics, processor electronics, and the like) to settings that are suitable to either allowing or disallowing trigger-based scheduling, as deemed necessary or appropriate. The STA is configured to convey the announcement as an indication within one or more data communication mechanisms, such as a HE Capabilities Element, Trigger Allowance element, or Trigger Allowance frame. As an example, the STA announcement is implemented as a Trigger Allowance Frame, which can have a format including an indication of the STA's selection whether to enable trigger-based scheduling.

At 410, the AP receives the announcement, for example a Trigger Allowance Frame from the STA. Upon receiving the communication from the STA, the AP performs a check at 415 to determine whether the transmitting STA has declared its support for trigger-based scheduling. In continuing with the example, an indication within the Trigger Allowance frame, such as setting a field within the frame to a particular value, signals that the STA is configured for receiving trigger frames from the AP. Therefore, the check at 415 serves as an indication as to whether the STA implements EDCA procedures in accordance with legacy EDCA parameters or low-priority EDCA parameters. In the case where the STA has announced its support for trigger-based scheduling, shown as "Yes" in FIG. 4, the AP continues to operation 420.

At 420, the AP assigns the STA the EDCA parameters in a set corresponding to a trigger-based scheduling scheme. In some implementations, the EDCA parameter set for a STA in the BSS that declares support for triggering includes low-priority EDCA parameters. That is, in relative terms, STAs operating according to low-priority EDCA parameters have a lower chance than STAs using "legacy" EDCA parameters to access the transmission medium during contention. Other characteristics associated with low-priority EDCA parameter settings can be applied to implement fairness among the STAs in EDCA procedures, including but not limited to: less medium time for uplink, longer contention window (CW), larger arbitrary inter-frame spacing (AIFS), and the like. In some implementations, the EDCA parameter set assigned to STAs that have announced trigger scheduling can be a tunable feature, that is appropriately defined as deemed appropriate or necessary. In some instances, operation 420 involves utilizing a data communication mechanism, such as an EDCA Parameter Set frame, for conveying to the STA the assigned EDCA Parameters determined by the AP and used by the enhanced distributed channel access function (EDCAF) to control its operation.

Alternatively, in the case where the STA has announced, via the Trigger Allowance frame for example, that it does not support trigger scheduling and/or HE trigger-based PPDU, the process performed by the AP then proceeds to operation 425. In this instance, at operation 425, the AP assigns the related STA "legacy" EDCA parameters. In some implementations, the "legacy" EDCA parameters set is implemented as EDCA parameters used by nominally operating STAs as specified by existing wireless networking technology standards.

Thereafter, at 430, the STA receives the EDCA parameters that have been assigned, or otherwise designated, at the AP. The most recent EDCA parameter set received by the STA is used to update the appropriate Management Information Base (MIB) values, and further used by the STA to contend for medium access (e.g., TXOPs), in some cases. As an example, the STA has declared its use of trigger scheduling and/or HE trigger-based PPDU, and thus receives low-priority EDCA parameters in the transmitted EDCA Parameter Set frame. In some implementations, the STA can adopt a configuration to adopt the EDCA parameter set upon receiving communication from the AP. Thus, the techniques realize a triggering schedule that can be customized, for example tuned based on the STAs capabilities and operational environment. Accordingly, the disclosed techniques potentially provide improved function of the network entities and increased MAC efficiency.

Figure 5:
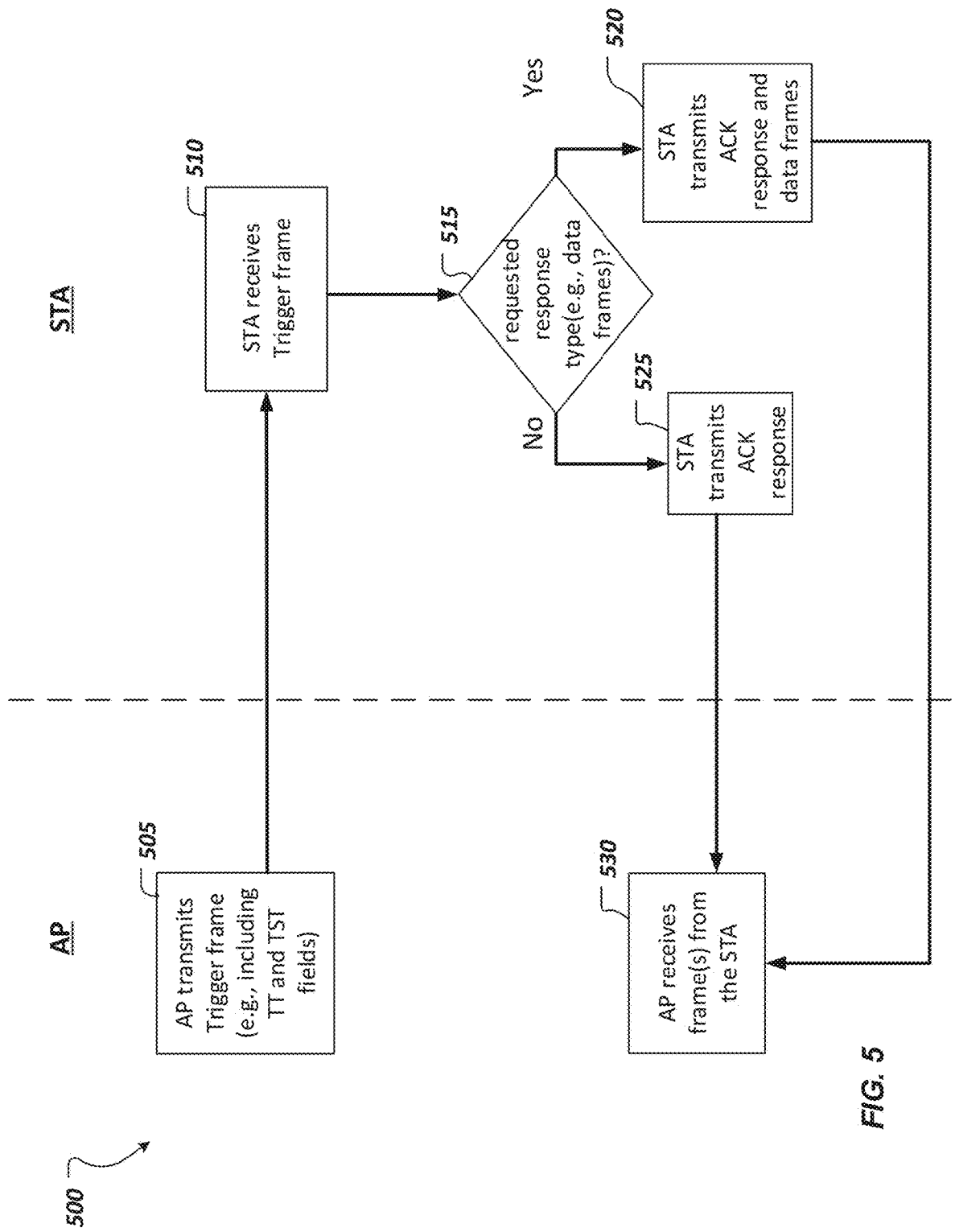
FIG. 5 shows a flow diagram of an example of process performed by an AP and a STA implementing acknowledgement techniques utilized with trigger frames.

FIG. 5 shows a flow diagram of an example of process 500 performed by an AP and a STA implementing acknowledgement techniques utilized with trigger frames. Various implementations of the disclosed acknowledgement techniques, which relate to the acknowledgement procedure 500, are also discussed in detail in reference to FIGS. 1A-1B.

The process 500 begins at 505, where the AP transmits a Trigger frame to the STA. According to the techniques described, the Trigger frame is formatted to include TT and TST, which serve to indicate that a specific frame type is requested as a response to the Trigger frame.

At 510, the STA receives the Trigger frame from the AP.

At 515, a check is performed by the STA, to determine the specific frame type that is being requested (by the AP) as a response to reception of the Trigger frame. The Trigger frame, based on the included TT and TST, conveys to the STA which specific frame type is usable to acknowledge receiving the Trigger frame from the AP. In some instances, shown as "Yes" in FIG. 5, the Trigger frame is determined to have a format indicating that the appropriate response includes transmission of additional frames, such as data/management MPDUs, from the STA. Based on the determination at 515, the response frame transmitted by the STA is implemented as having a frame type that corresponds to the specific frame type indicated in the Trigger frame. Accordingly, at 520, the STA transmits an aggregation of an ACK frame with data frame(s), which are the additional frames associated with the response. Thereafter, at 530, the AP receives the aggregation of the ACK frame and the data frame(s), as transmitted by the STA.

In some cases, the Trigger frame is determined to have a format indicating that the appropriate response does not require the transmission of additional frames, shown as "No" in FIG. 5. As a result, at 525, the STA transmits a response to the Trigger frame that contains at least the frame with the required type (if available at the STA side). As shown in FIG. 5, the STA transmits an ACK frame in response to receiving the Trigger frame. Thereafter, at 530, the AP receives the ACK frame, as transmitted by the STA.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. A client station comprising:
   a transmitter configured to transmit a first frame including an indication indicating whether the client station that is enabled to be scheduled by an access point for uplink frame transmission is ready to be scheduled; and
   a receiver configured to:
   (i) receive a second frame from the access point in response to the indication indicating that the client station is ready to be scheduled for uplink frame transmission, the second frame indicating resource allocation for the client station; and
   (ii) not receive the second frame from the access point in response to the indication indicating that the client station is not ready to be scheduled for uplink frame transmission;
   wherein the client station uses the resource allocation and a first set of parameters to perform uplink frame transmission at a different priority than a legacy station that is incapable of being scheduled by the access point in response to the client station being ready to be scheduled; and
   wherein the client station uses a second set of parameters to perform uplink frame transmission at the same priority as the legacy station in response to the client station being not ready to be scheduled.

2. The client station of claim 1 wherein the client station performs the uplink frame transmission at a lower priority than the legacy station in response to the client station being ready to be scheduled.

3. The client station of claim 2 wherein the client station performs enhanced distribution channel access according to the first set of parameters or the second set of parameters.

4. The client station of claim 2 wherein:
   the client station, the legacy station, and the access point operate in a high efficiency wireless local area network;
   the client station is a high efficiency client station; and
   the legacy station is not a high efficiency client station.

\* \* \* \* \*